(12) United States Patent
Furuichi

(10) Patent No.: US 10,887,844 B2
(45) Date of Patent: Jan. 5, 2021

(54) COMMUNICATION CONTROL DEVICE, COMMUNICATION CONTROL METHOD, AND COMPUTER PROGRAM

(71) Applicant: Sony Corporation, Tokyo (JP)

(72) Inventor: Sho Furuichi, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 16/331,989

(22) PCT Filed: Oct. 3, 2017

(86) PCT No.: PCT/JP2017/035984
§ 371 (c)(1),
(2) Date: Mar. 11, 2019

(87) PCT Pub. No.: WO2018/074222
PCT Pub. Date: Apr. 26, 2018

(65) Prior Publication Data
US 2019/0239165 A1    Aug. 1, 2019

(30) Foreign Application Priority Data

Oct. 20, 2016    (JP) .................................. 2016-206027

(51) Int. Cl.
*H04W 52/24*    (2009.01)
*H04W 16/14*    (2009.01)
(Continued)

(52) U.S. Cl.
CPC ......... *H04W 52/243* (2013.01); *H04W 16/14* (2013.01); *H04W 52/04* (2013.01); *H04W 52/367* (2013.01); *H04W 72/0453* (2013.01)

(58) Field of Classification Search
None
See application file for complete search history.

(56) References Cited

U.S. PATENT DOCUMENTS

| | | | |
|---|---|---|---|
| 2007/0173271 A1* | 7/2007 | Hulkkonen | ......... H04B 1/1027 455/509 |
| 2010/0330919 A1 | 12/2010 | Gurney et al. | |

(Continued)

FOREIGN PATENT DOCUMENTS

| | | |
|---|---|---|
| JP | 2012-034007 A | 2/2012 |
| JP | 5679033 B2 | 3/2015 |
| WO | 2014/129035 A1 | 8/2014 |

OTHER PUBLICATIONS

International Search Report dated Nov. 28, 2017 for PCT/JP2017/035984 filed on Oct. 3, 2017, 7 pages including English Translation.

(Continued)

*Primary Examiner* — Otis L Thompson, Jr.
(74) *Attorney, Agent, or Firm* — Xsensus, LLP

(57) ABSTRACT

[Object] To provide a communication control device capable of appropriately counting the number of secondary systems even in a case in which operation frequency bands of primary and secondary system are different.
[Solution] Provided is a communication control device including an interference source calculation unit configured to calculate an actual number of interference sources for a first wireless system, using information regarding interference imposed on the first wireless system from a second wireless system using a second frequency band at least partially overlapping a first frequency band used by the first wireless system.

8 Claims, 15 Drawing Sheets

(51) Int. Cl.
  *H04W 52/36* (2009.01)
  *H04W 52/04* (2009.01)
  *H04W 72/04* (2009.01)

(56) References Cited

U.S. PATENT DOCUMENTS

| | | |
|---|---|---|
| 2013/0223348 A1 | 8/2013 | Piggin et al. |
| 2014/0269545 A1* | 9/2014 | Galeev ................. H04B 1/1036 |
| | | 370/329 |
| 2015/0333853 A1 | 11/2015 | Sawai et al. |
| 2016/0073415 A1* | 3/2016 | Rahman ............... H04B 17/345 |
| | | 370/329 |
| 2017/0048715 A1* | 2/2017 | Fan ....................... H04W 16/10 |
| 2017/0310406 A1* | 10/2017 | Wang ................... H04B 17/345 |
| 2019/0007852 A1* | 1/2019 | Kikuzuki ........... H04B 17/3912 |
| 2019/0373609 A1* | 12/2019 | Kim .................... H04B 17/336 |

OTHER PUBLICATIONS

Extended Search Report issued in European Application 17861966.4-1215 dated Aug. 19, 2019.

* cited by examiner

«COMMUNICATION CONTROL DEVICE, COMMUNICATION CONTROL METHOD, AND COMPUTER PROGRAM

CROSS-REFERENCE TO RELATED APPLICATIONS

The present application is based on PCT filing PCT/JP2017/035984, filed Oct. 3, 2017, which claims priority to JP 2016-206027, filed Oct. 20, 2016, the entire contents of which are incorporated herein by reference.

TECHNICAL FIELD

The present disclosure relates to a communication control device, a communication control method, and a computer program.

BACKGROUND ART

In recent years, various kinds of wireless systems such as a cellular network, a wireless local area network (LAN), a TV broadcasting system, a satellite communication system, and program making special events (PMSE) are in widespread use. To allow each wireless system to normally operate, it is desirable that frequency resources to be utilized are managed so that interference does not occur among the wireless systems. This is also similarly desirable among local networks included in one wireless system.

Regarding management of frequency resources, as one measure for alleviating depletion of frequency resources in the future, frequency sharing is studied. For example, a mechanism for causing a frequency channel allocated to one wireless system to be temporarily utilized by another wireless system is studied. There is a case where such a mechanism is also referred to as frequency secondary utilization. In general, a system to which a frequency channel has been allocated by priority is called a primary system, and a system that secondarily utilizes the frequency channel is called a secondary system.

A number of technologies for appropriately managing frequency resources have been developed. For example, the following Patent Literature 1 discloses a technology of suppressing a case where communication by base stations becomes a cause of interference by frequencies being allocated in accordance with locations of the base stations.

CITATION LIST

Patent Literature

Patent Literature 1: JP 5679033B

DISCLOSURE OF INVENTION

Technical Problem

In Electronic Communication Commission (ECC) Report 186 which was issued in 2013 by the European Conference of Postal and Telecommunications Administrations (CEPT) and has legislated guidelines of TV White Space (TVWS) systems utilizing the geographic unused frequency band of a TV broadcast frequency band, three kinds of interference margin setting methods for calculating maximum allowable transmission power of a secondary system are regulated to protect a primary system. These methods are performed on the basis of the number of secondary systems. However, in frequency sharing regulated in 47 C.F.R. Part 96 of the United States, it is necessary to protect a fixed satellite service (FSS) as one of the primary systems. However, there is a possibility of an operation frequency band or bandwidth being different in a citizens broadband radio service (CBSD) which is a secondary system. Therefore, when the same interference margin setting methods as those of ECC Report 186 are applied, there is concern of the number of devices operating as the secondary systems not being appropriately counted and consequently the interference margin not being appropriately set.

Accordingly, the present disclosure proposes a novel and improved communication control device, communication control method, and computer program capable of appropriately counting the number of secondary systems even in a case in which operation frequency bands of primary and secondary system are different.

Solution to Problem

According to the present disclosure, there is provided a communication control device including an interference source calculation unit configured to calculate an actual number of interference sources for a first wireless system, using information regarding interference imposed on the first wireless system from a second wireless system using a second frequency band at least partially overlapping a first frequency band used by the first wireless system.

In addition, according to the present disclosure, there is provided a communication control method including calculating an actual number of interference sources for a first wireless system, using information regarding interference imposed on the first wireless system from a second wireless system using a second frequency band at least partially overlapping a first frequency band used by the first wireless system.

In addition, according to the present disclosure, there is provided a computer program causing a computer to perform calculating an actual number of interference sources for a first wireless system, using information regarding interference imposed on the first wireless system from a second wireless system using a second frequency band at least partially overlapping a first frequency band used by the first wireless system.

Advantageous Effects of Invention

According to the present disclosure, as described above, it is possible to provide a novel and improved communication control device, communication control method, and computer program capable of appropriately counting the number of secondary systems even in a case in which operation frequency bands of primary and secondary systems are different.

Note that the effects described above are not necessarily limitative. With or in the place of the above effects, there may be achieved any one of the effects described in this specification or other effects that may be grasped from this specification.

MODE(S) FOR CARRYING OUT THE INVENTION

Figure 1:
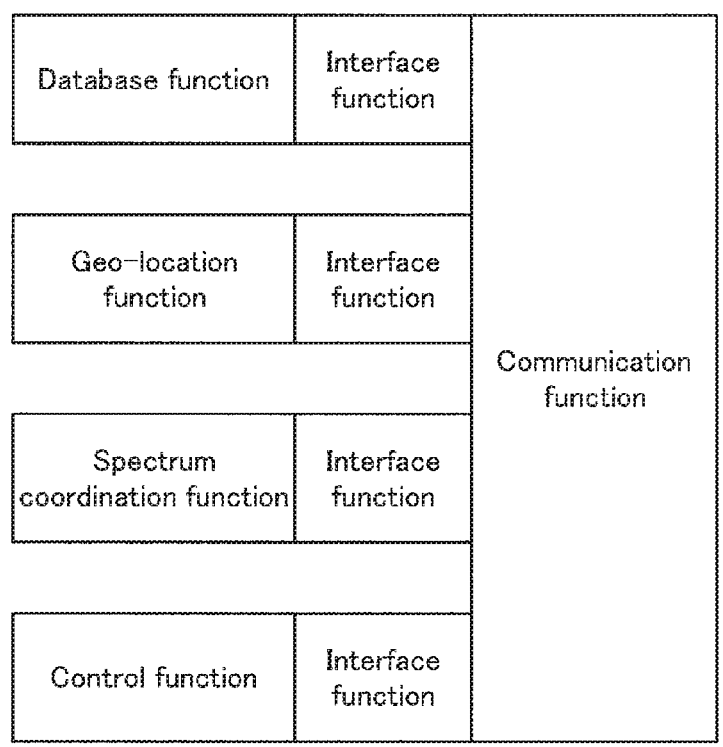
FIG. 1 is an explanatory diagram illustrating a logical architecture assumed according to an embodiment of the present disclosure.

Hereinafter, (a) preferred embodiment(s) of the present disclosure will be described in detail with reference to the appended drawings. Note that, in this specification and the appended drawings, structural elements that have substantially the same function and structure are denoted with the same reference numerals, and repeated explanation of these structural elements is omitted.

Note that the description will be made in the following order.
1. Embodiment of present disclosure
1.1. Overview
1.2. System model example
1.3. Configuration example
1.4. Operation example
1.5. Advantageous effect examples
2. Conclusion

1. Embodiment of Present Disclosure

1.1. Overview

Before an embodiment of the present disclosure is described in detail, an overview of the embodiment of the present disclosure will be described.

As described above, in order to protect a primary system, ECC Report 186 regulates three kinds of interference margin setting methods of calculating maximum allowable transmission power of a secondary system. The three kinds of interference margin setting methods are a fixed/predetermined margin, a flexible margin, and a flexible minimized margin.

An object of all three kinds of interference margin methods is to distribute an allowable given interference amount to a plurality of wireless communication devices so that an allowable interference amount is satisfied.

The fixed/predetermined margin is an interference margin that is set on the basis of the number of communication devices which may be interference sources in a specific geographic region. Accordingly, regardless of an operation frequency band of the FSS or the CBSD, the interference margin can be set by counting the number of CBSDs.

The flexible minimized margin is a scheme of obtaining an effect of suppressing limitation of excessive transmission power by the fixed/predetermined margin and the flexible margin. In addition, the flexible margin is a scheme of counting the number of wireless communication devices which are operating per channel.

When the primary system is a television broadcast, operation frequency bands or bandwidths of the primary system and the secondary system are decided. By applying the same counting method as that of ECC Report 186, it is possible to appropriately set an interference margin. However, in the frequency sharing regulated in 47 C.F.R. Part 96 of the United States, it is necessary to protect a fixed satellite service (FSS) as one of the primary systems, but there is a possibility of the operation frequency band or bandwidth being different in the CBSD which is a secondary system. Therefore, when the same interference margin setting methods as those of ECC Report 186 are applied, there is concern of the number of devices operating as the secondary systems not being appropriately counted and consequently the interference margin not being appropriately set.

Thus, in view of the above description, the authors of the present disclosure have thoroughly examined a technology for appropriately counting the number of devices operating as secondary systems regardless of a difference in an operation frequency band or bandwidth between primary and secondary systems and appropriately setting an interference margin on the basis of the counted number. As a result, as will be described below, the authors of the present disclosure have devised a technology for appropriately counting the number of devices operating as secondary systems regardless of a difference in an operation frequency band or bandwidth between the primary and secondary systems and appropriately setting an interference margin on the basis of the counted number.

The overview of the embodiment of the present disclosure has been described above. Next, an embodiment of the present disclosure will be described in detail.

1.2. System Model Example

A system model of the embodiment of the present disclosure will be described. A logical architecture assumed in the embodiment of the present disclosure will be described first.

FIG. 1 is an explanatory diagram illustrating a logical architecture assumed according to an embodiment of the present disclosure. Each function in FIG. 1 will be described.

A database function is a logical entity that maintains information regarding communication devices of a secondary system, information regarding a primary business system (primary system), and the like and performs information management of the communication devices of the secondary system.

A geo-location function is a logical entity that performs calculation of operation parameters which are recommended for the communication devices of the secondary system and are required to be obeyed using information regarding positions of the communication devices of the secondary system.

A spectrum coordinate function is a logical entity that performs information processing related to coordination of frequency use. The spectrum coordination function can include a sensing function for a communication device, a frequency allocation function for a communication device, a coexistence control function, a communication device management function of binding a plurality of communication devices, and the like. Note that these functions can be mounted as separate and independent entities for each function.

A control function is a logical entity that performs conversion to mutually understand a message which is notified of by the database function or the geo-location function or a message of which the database function or the geo-location function is notified by a communication device of the secondary system, or performs a change or the like of operation parameters of the communication device of the secondary system.

An interface function is a logical entity equivalent to a communication unit of each logical entity. In addition, the communication function is an entity equivalent to a communication path between the logical entities.

A mounting example based on the logical architecture that has such a configuration will be described.

Figure 2:
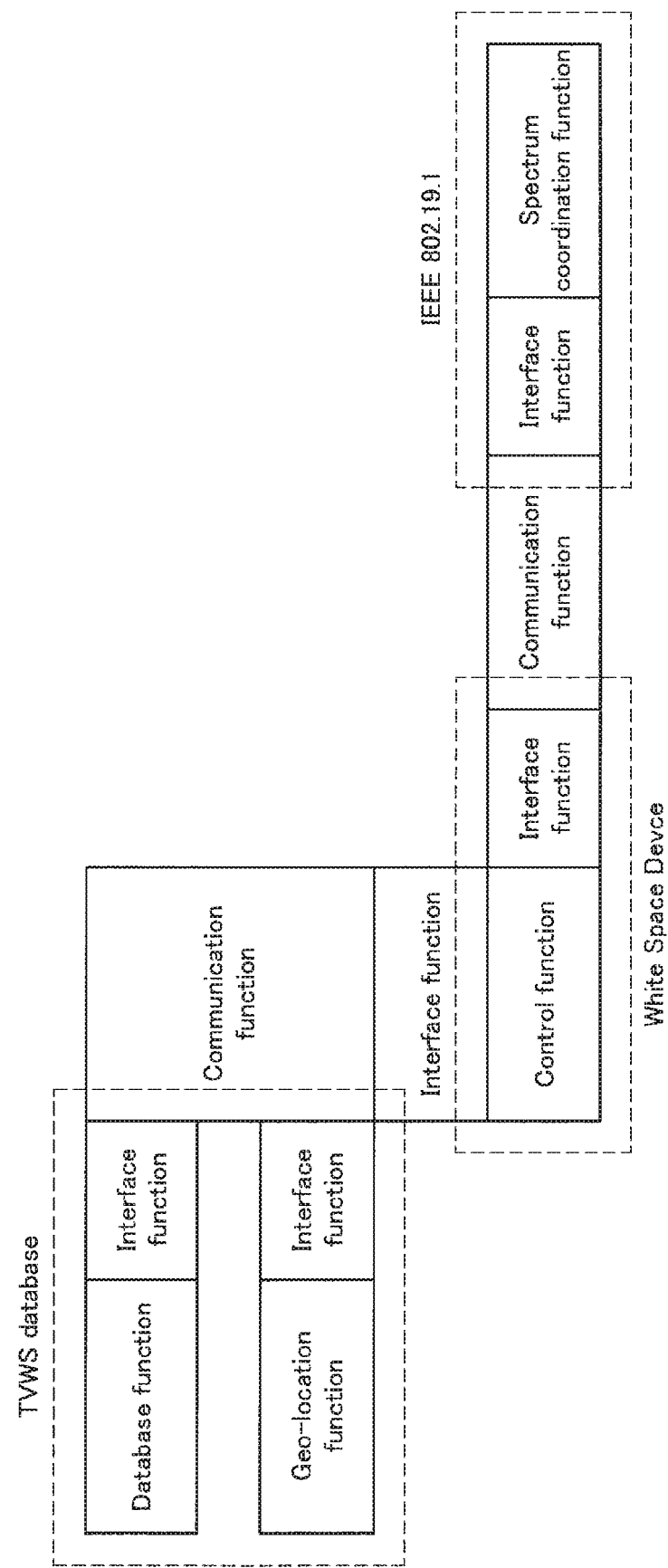
FIG. 2 is an explanatory diagram illustrating a mounting example based on the logical architecture illustrated in FIG. 1.

FIG. 2 is an explanatory diagram illustrating a mounting example based on the logical architecture illustrated in FIG. 1. FIG. 2 illustrates a mounting example of a TV white space (TVWS) database and a network coexistence technology (IEEE 802.19.1). As illustrated in FIG. 2, the TVWS database includes a database function, a geo-location function, and interface functions equivalent to communication units of the logical entities. A communication device (white space device) that performs communication using a frequency of television broadcast includes a control function and an interface function equivalent to a communication unit of the control function, as illustrated in FIG. 2. In addition, IEEE 802.19.1 includes a spectrum coordination function and an interface function equivalent to a communication unit of the spectrum coordination function, as illustrated in FIG. 2.

Figure 3:
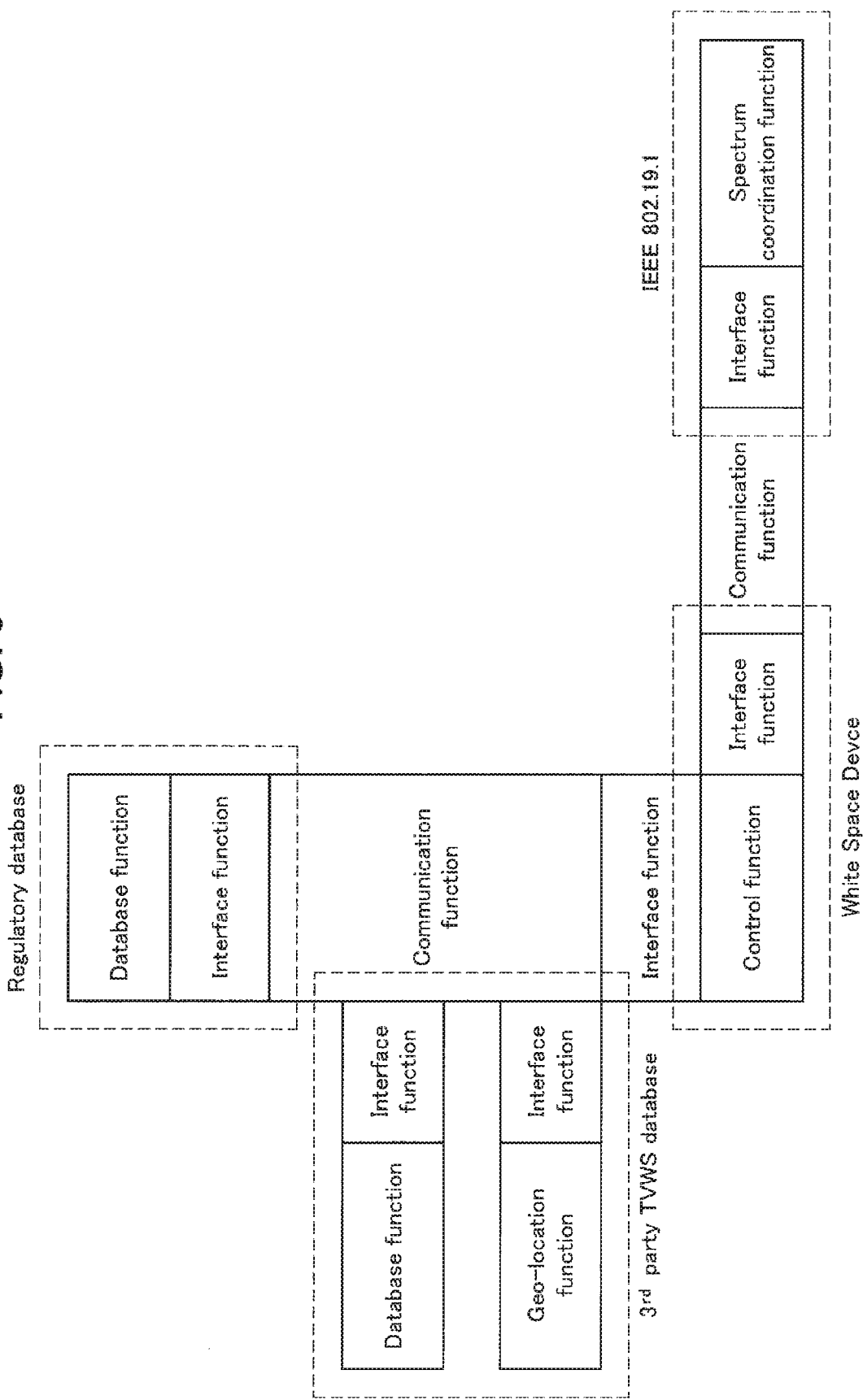
FIG. 3 is an explanatory diagram illustrating a mounting example based on the logical architecture illustrated in FIG. 1.

FIG. 3 is an explanatory diagram illustrating a mounting example based on the logical architecture illustrated in FIG. 1. FIG. 3 illustrates a mounting example of a network coexistence technology (IEEE 802.19.1) for a Britain TVWS system. As illustrated in FIG. 3, a TVWS database of a third party includes a database function and a geo-location function, and interface functions equivalent to communication units of the logical entities. A regulatory database includes a database function and an interface function equivalent to the communication unit of the database function. The white space device includes a control function and an interface function equivalent to a communication unit of the control function. In addition. IEEE 802.19.1 includes a spectrum coordination function and an interface function equivalent to a communication unit of the spectrum coordination function.

Figure 4:
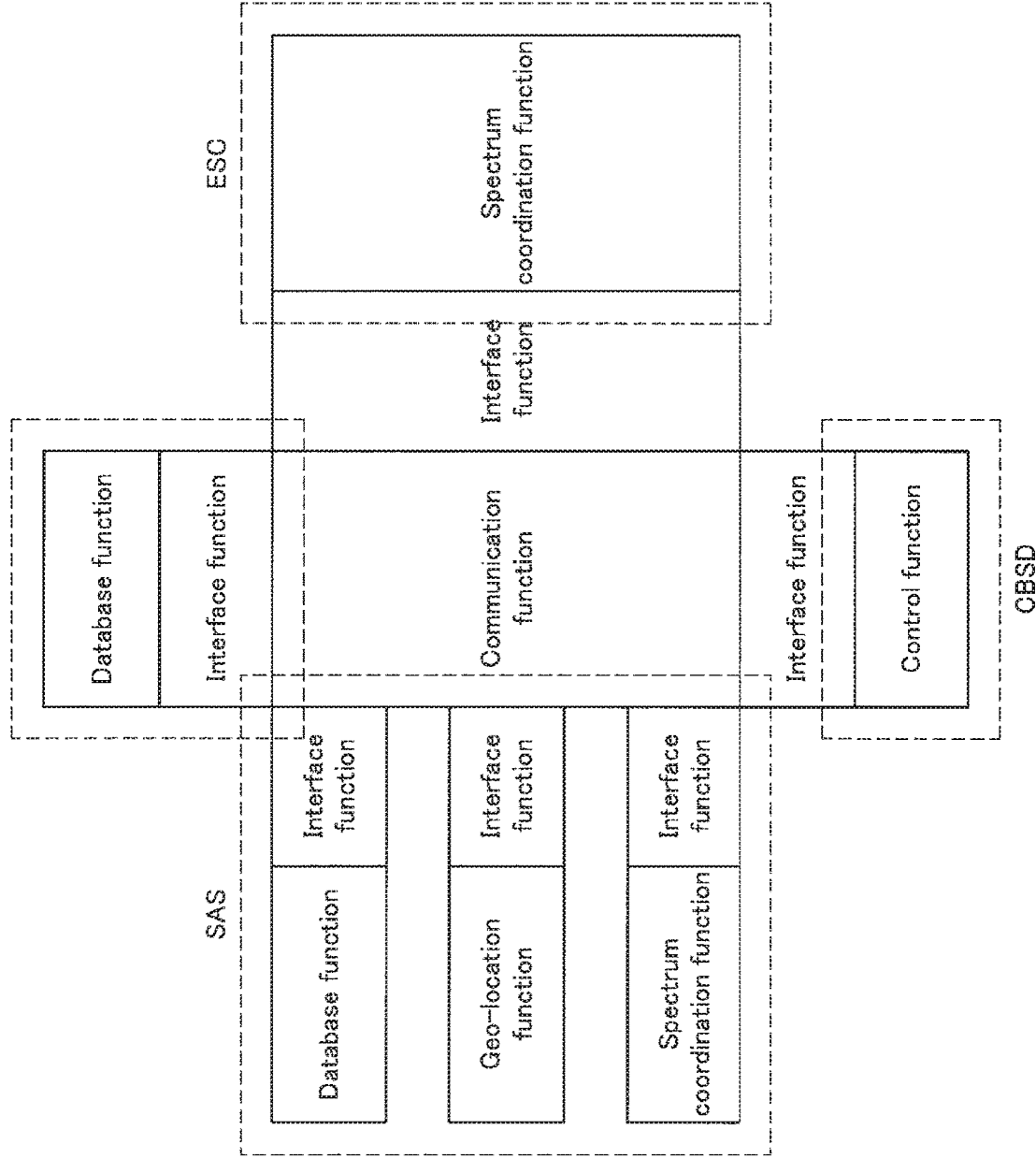
FIG. 4 is an explanatory diagram illustrating a mounting example based on the logical architecture illustrated in FIG. 1.

FIG. 4 is an explanatory diagram illustrating a mounting example of the citizens broadband radio service (CBRS) based on Code of Federal Regulations (C.F.R.) Part 96 of the Federal Communications Commission (FCC) of the United States.

A spectrum access system (SAS) includes a database function, a geo-location function, a spectrum coordination function, and interface functions equivalent to communication units of the logical entities. An environmental sensing capability (ESC) includes a spectrum coordination function and an interface function equivalent to a communication unit of the spectrum coordination function. An FCC (regulatory) database includes a database function and an interface function equivalent to a communication unit of the database function. A CBSD includes a control function and an interface function equivalent to a communication unit of the control function.

Figure 5:
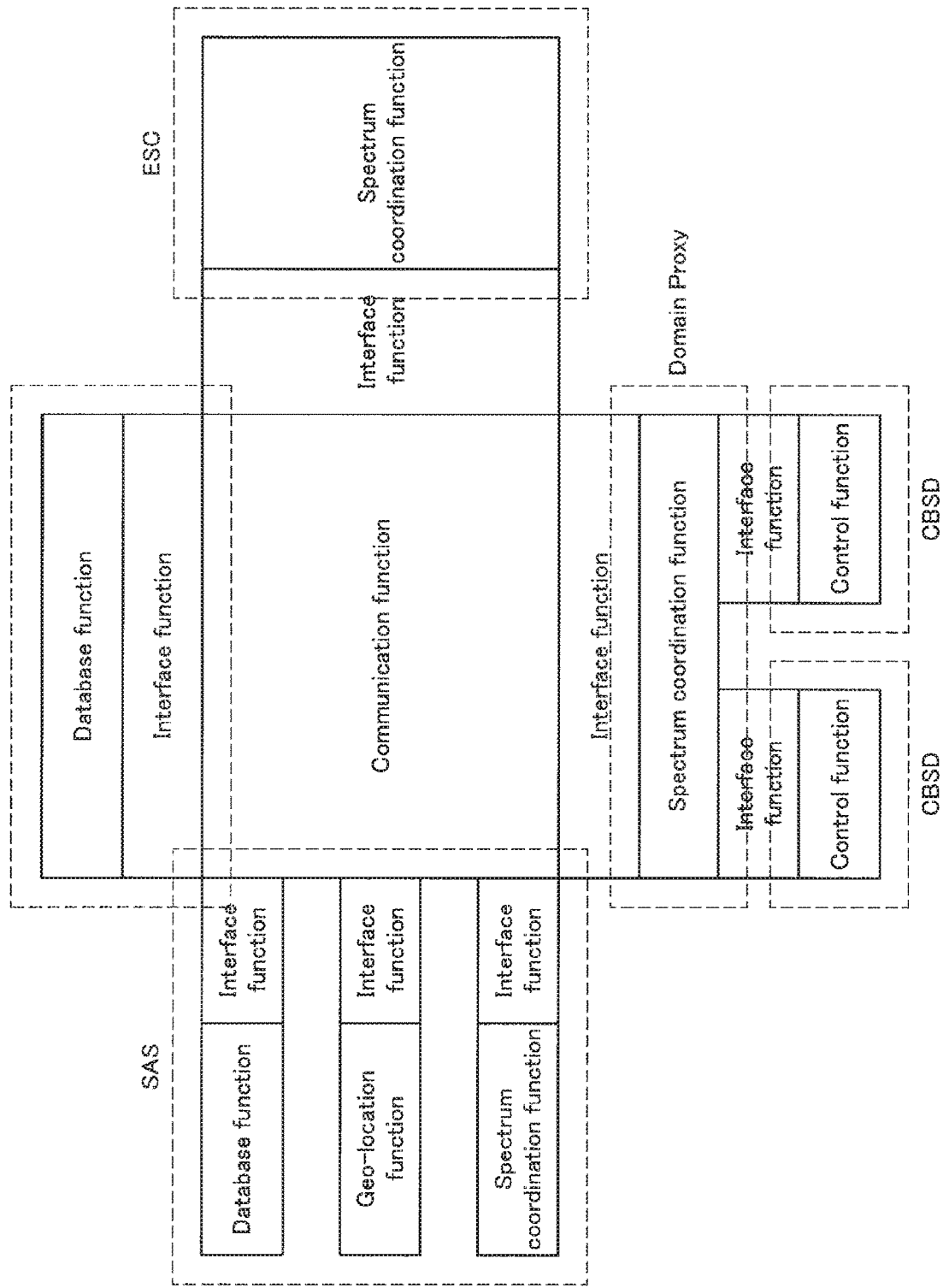
FIG. 5 is an explanatory diagram illustrating a mounting example based on the logical architecture illustrated in FIG. 1.

FIG. 5 is an explanatory diagram illustrating another mounting example of a CBRS based on C.F.R. Part 96 of the FCC of the United States.

A spectrum access system (SAS) includes a database function, a geo-location function, a spectrum coordination function, and interface functions equivalent to communication units of the logical entities. An environmental sensing capability (ESC) includes a spectrum coordination function and an interface function equivalent to a communication unit of the spectrum coordination function. An FCC (regulatory) database includes a database function and an interface function equivalent to a communication unit of the database function. A domain proxy includes a spectrum coordination function and an interface function equivalent to a communication unit of the spectrum coordination function. A control function and an interface function equivalent to a communication unit of the control function are included.

Figure 6:
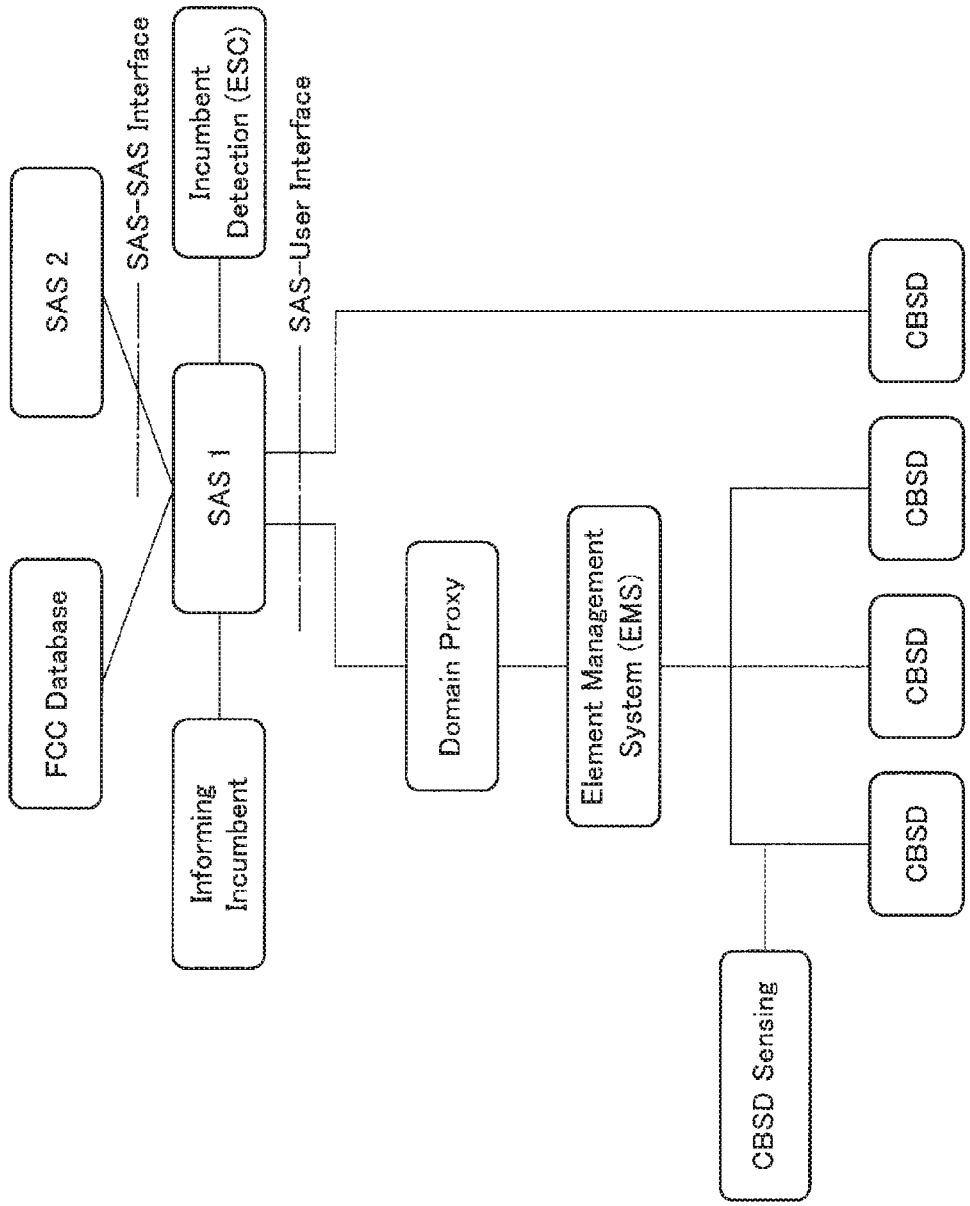
FIG. 6 is an explanatory diagram illustrating an SAS notional architecture extracted from SAS-CBSD Protocol Technical Report A.

The mounting example illustrated in FIG. 5 is a mounting example of an architecture described in SAS-CBSD Protocol Technical Report A (see http://apps.fcc.gov/ecfs/document/view?Id=60001415736) issued by the Wireless Innovation Forum. FIG. 6 is an explanatory diagram illustrating an SAS notional architecture extracted from SAS-CBSD Protocol Technical Report A.

Hereinafter, a preferred scenario will be described mixing terms appearing in a spectrum access system on the basis of the spectrum access system. However, the present disclosure is not, of course, limited to the spectrum access system.

Table 1 shows a difference between a TV band and a high frequency band used in a primary system considered in the embodiment. In the embodiment, a channel width of the secondary system is an important point.

TABLE 1

(Differences between TV band and high frequency band)

|  | TV band | High frequency band |
| --- | --- | --- |
| Radio wave propagation distance | Long | Short |
| Application of multi-antenna technology (beamforming or the like) | Low possibility | High possibility |
| Protection target | Television receiver Wireless microphone | Satellite earth station |
| Accurate positional information of protection target | Not available | Available |
| Secondary channel width | Same channel width as protection target | Different channel width from protection target |
| Protection reference | Protection ratio Location probability | Interference-to-thermal noise ratio (I/N) LNA/LNB saturation reference |

The system model according to the embodiment of the present disclosure has been described above. Next, a configuration example of a communication control device according to the embodiment of the present disclosure will be described.

1.3. Configuration Example

Figure 7:
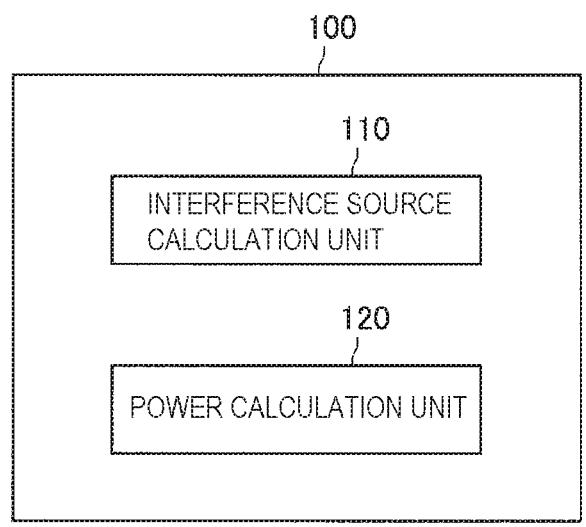
FIG. 7 is an explanatory diagram illustrating a configuration example of a communication control device according to the embodiment of the present disclosure.

FIG. 7 is an explanatory diagram illustrating a configuration example of the communication control device according to the embodiment of the present disclosure. Hereinafter, the configuration example of the communication control device according to the embodiment of the present disclosure will be described with reference to FIG. 7.

As illustrated in FIG. 7, a communication control device 100 according to the embodiment of the present disclosure includes an interference source calculation unit 110 and a power calculation unit 120.

The interference source calculation unit 110 calculates an actual number of interference sources (CBSD) of a secondary system to a primary system, using information regarding interference imposed on the primary system from the secondary system using a frequency band at least partially overlapping a frequency band used by the primary system. A method in which the interference source calculation unit 110 calculates the actual number of interference sources of the secondary system to the primary system will be described in detail later.

Here, as the information regarding interference imposed on the primary system, as will be described below, there is an adjacent channel interference power ratio related to the interference imposed on the primary system from the secondary system and a parameter regarding the adjacent channel interference power ratio. In addition, the actual number calculated by the interference source calculation unit 110 is assumed to be a number equivalent to the total number of devices operated at the same channel and the same bandwidth as those of the primary system by the secondary system.

On the basis of the actual number of interference sources calculated by the interference source calculation unit 110, the power calculation unit 120 calculates maximum allowable transmission power of the secondary system so that an allowable interference level of the primary system is satisfied.

Because the communication control device 100 according to the embodiment of the present disclosure has this configuration, it can appropriately count the number of devices operating as the secondary systems regardless of a difference in the operation frequency band or bandwidth between the primary system and the secondary system, appropriately set an interference margin on the basis of the counted number, and calculate the maximum allowable transmission power of the secondary system.

The communication control device 100 according to the embodiment of the present disclosure can be equivalent to, for example, the geo-location function or the spectrum coordination function in the logical architecture illustrated in FIG. 1. Accordingly, the communication control device 100 according to the embodiment of the present disclosure can be equivalent to, for example, the SAS or the ESC in the mounting example illustrated in FIG. 4 or 5.

A configuration example of the communication control device according to the embodiment of the present disclosure has been described above. Next, an operation example of the communication control device according to the embodiment of the present disclosure will be described.

1.4. Operation Example

First, a method of deriving interference calculation parameters in accordance with a channel width to count the actual number of interference sources (CBSDs) of the secondary system will be described. Thereafter, a method of counting the interference sources based on the interference calculation parameters will be described.

To consider emission of electric waves at the same channel or an adjacent channel, an adjacent channel leakage ratio (ACLR), adjacent channel selectivity (ACS), and the like are considered as the interference calculation parameters.

Figure 8:
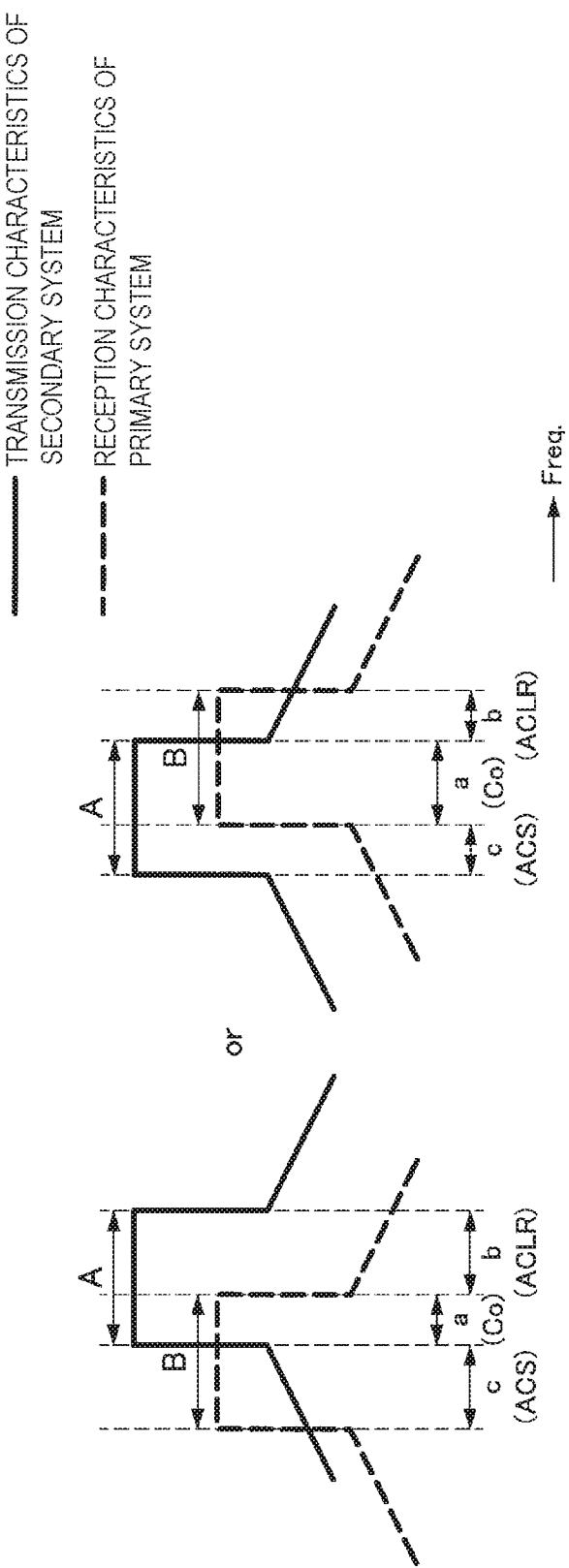
FIG. 8 is an explanatory diagram illustrating an aspect in which frequency bands used in a primary system and a secondary system partially overlap.

FIG. 8 is an explanatory diagram illustrating an aspect in which frequency bands used in a primary system and a secondary system partially overlap. The horizontal direction represents a frequency and the vertical direction represents magnitude of transmission power in each system. In FIG. 8, A indicates a channel width of the secondary system, a indicates a channel width at which the primary system receives the same channel interference, b indicates a channel width at which the primary system receives interference caused by leakage, c indicates a channel width in which the primary system receives interference caused by its own selectivity, and B indicates a channel width of the primary system.

In a case in which the frequency bands used in the primary system and the second system partially overlap as in FIG. 8, reception interference power $I_p$ of the primary system can be calculated as follows. $I_s$ indicates the same channel interference power.

$$I_p = \frac{a}{A}I_s + \frac{b}{B} \cdot 10^{\frac{-ACLR_{(dB)}}{10}} \cdot I_s + \frac{c}{A} \cdot 10^{\frac{-ACS_{(dB)}}{10}} \cdot I_s \quad \text{[Math. 1]}$$
$$= \left(\frac{a}{A} + \frac{b}{B} \cdot 10^{\frac{-ACLR_{(dB)}}{10}} + \frac{c}{A} \cdot 10^{\frac{-ACS_{(dB)}}{10}}\right) \cdot I_s$$

An adjacent channel interference power ratio (ACIR) is obtained as follows.

$$ACIR = \frac{I_p}{I_s} \quad \text{[Math. 2]}$$
$$= \frac{a}{A} + \frac{b}{B} \cdot 10^{\frac{-ACLR_{(dB)}}{10}} + \frac{c}{A} \cdot 10^{\frac{-ACS_{(dB)}}{10}}$$
$$ACIR_{(dB)} = 10\log_{10}\left(\frac{a}{A} + \frac{b}{B} \cdot 10^{\frac{-ACLR_{(dB)}}{10}} + \frac{c}{A} \cdot 10^{\frac{-ACS_{(dB)}}{10}}\right)$$

By changing the parameters a, b, and c illustrated in FIG. 8, it is possible to change patterns of the frequency bands used in the primary system and the secondary system.

Figure 9:
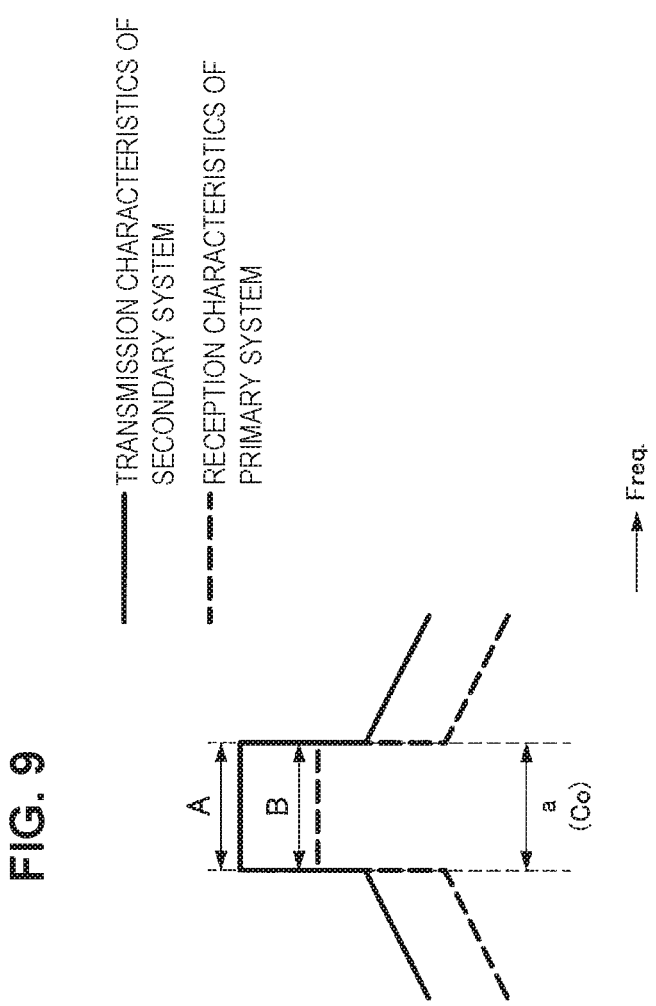
FIG. 9 is an explanatory diagram illustrating an aspect in which the frequency bands used in the primary system and the secondary system completely overlap.

FIG. 9 is an explanatory diagram illustrating an aspect in which the frequency bands used in the primary system and the secondary system completely overlap. That is, in this case, a=A=B and b=c=0. In this case, since ACS=0 and ACLR=∞ can be assumed, $ACIR_{(dB)}$=0.

Figure 10:
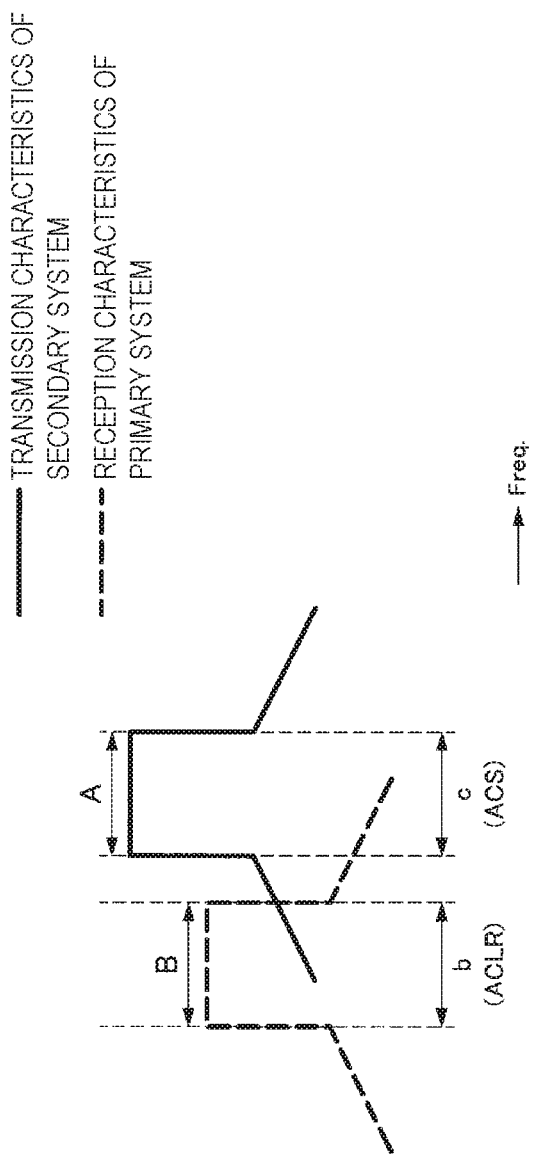
FIG. 10 is an explanatory diagram illustrating an aspect in which the frequency bands used in the primary system and the secondary system do not completely overlap.

FIG. 10 is an explanatory diagram illustrating an aspect in which the frequency bands used in the primary system and the secondary system do not completely overlap. That is, in this case, a=0, b=B, and c=A. In this case, $ACIR_{(dB)}$ is obtained as follows.

$$ACIR_{(dB)} = 10\log_{10}\left(10^{\frac{-ACLR_{(dB)}}{10}} + 10^{\frac{-ACS_{(dB)}}{10}}\right) \quad \text{[Math. 3]}$$

Figure 11:
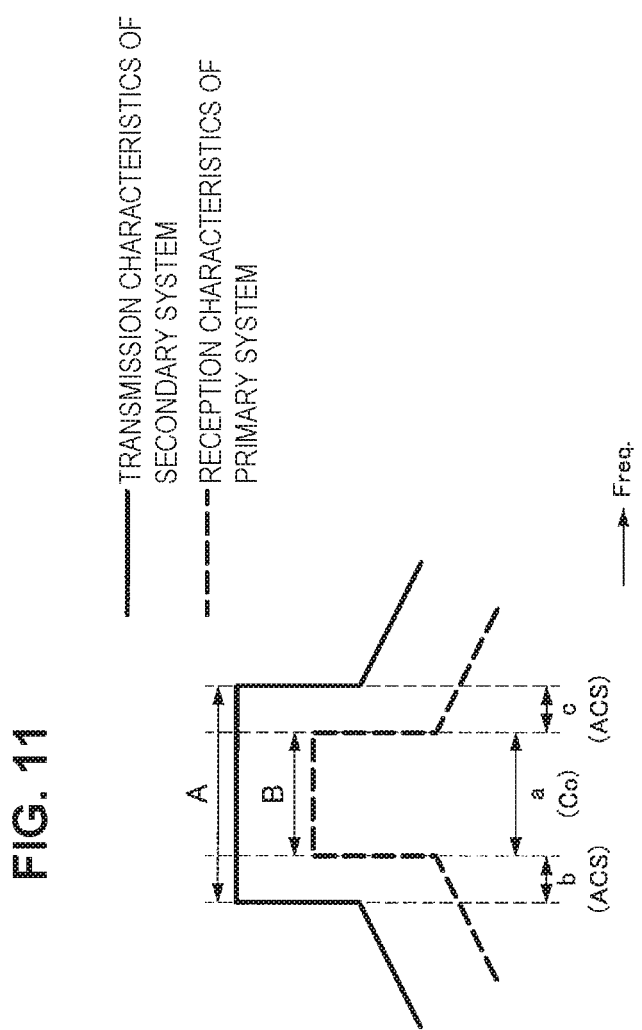
FIG. 11 is an explanatory diagram illustrating an aspect in which the frequency bands used in the primary system and the secondary system are completely different and the frequency band of the secondary system overlaps the frequency band of the primary system.

FIG. 11 is an explanatory diagram illustrating an aspect in which the frequency bands used in the primary system and the secondary system are completely different and the frequency band of the secondary system overlaps the frequency band of the primary system. That is, in this case, A>B, a=B, and a+b+c=A. In this case, $ACIR_{(dB)}$ is obtained as follows.

$$ACIR_{(dB)} = 10\log_{10}\left(\frac{a}{A} + \frac{b+c}{A} \cdot 10^{\frac{-ACS_{(dB)}}{10}}\right) \quad \text{[Math. 4]}$$

Figure 12:
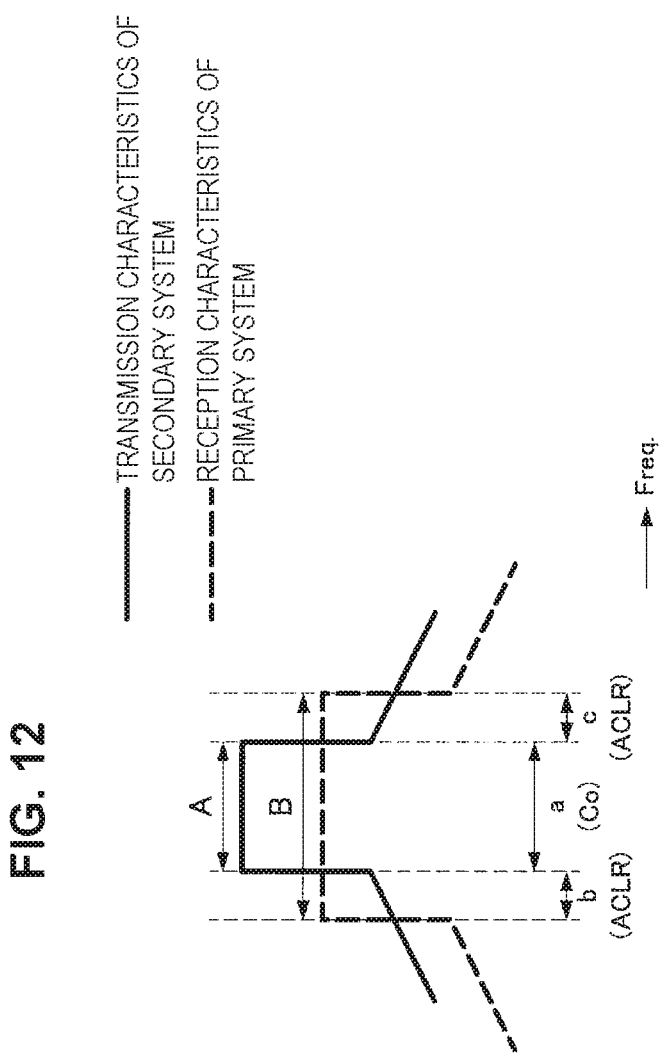
FIG. 12 is an explanatory diagram illustrating an aspect in which the frequency bands used in the primary system and the secondary system are completely different and the frequency band of the primary system overlaps the frequency band of the secondary system.

FIG. 12 is an explanatory diagram illustrating an aspect in which the frequency bands used in the primary system and the secondary system are completely different and the frequency band of the primary system overlaps the frequency band of the secondary system. That is, in this case, A<B, a=A, and a+b+c=B. In this case, $ACIR_{(dB)}$ is obtained as follows.

$$ACIR_{(dB)} = 10\log_{10}\left(\frac{a}{A} + \frac{b+c}{B} \cdot 10^{\frac{-ACLR_{(dB)}}{10}}\right) \quad \text{[Math. 5]}$$

In this way, in the primary system. $ACIR_{(dB)}$ differs in accordance with the frequency band used in the secondary system. The calculation of $ACIR_{(dB)}$ may be performed by the interference source calculation unit 110 or may be performed outside of the communication control device 100.

Figure 13:
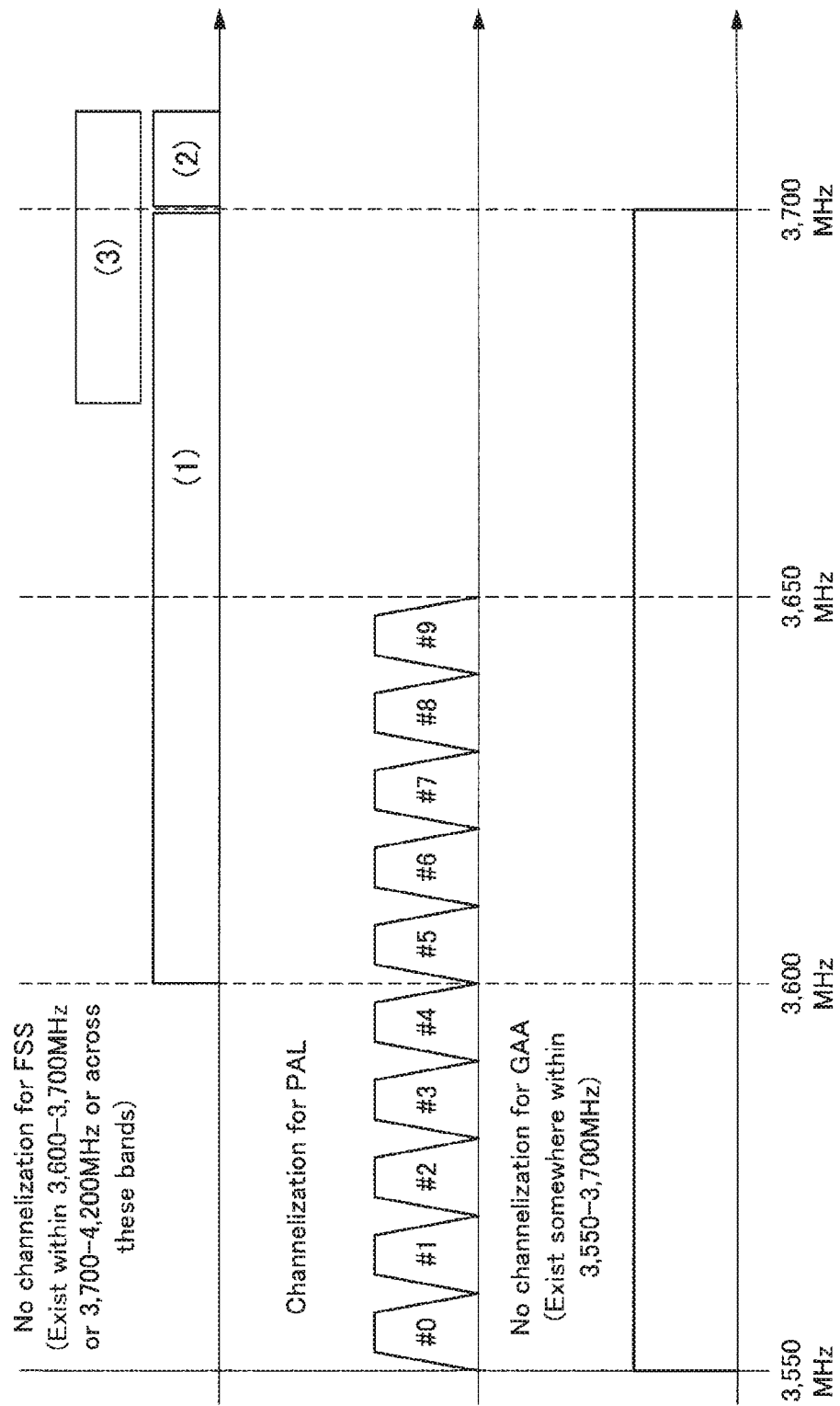
FIG. 13 is an explanatory diagram illustrating a use form of a frequency of a CBSD assumed in a CBRS band of 3.5 GHz of the United State of America.

Next, a method of counting the actual number of interference sources based on the ACLR will be described. FIG. 13 is an explanatory diagram illustrating a use form of a frequency of a CBSD assumed in a CBRS band of 3.5 GHz of the United State of America. Depending on the CBSD, the bandwidth can be changed and the FSS overlapping bandwidth can also be changed. As illustrated in FIG. 13, as operation frequencies of the FSS, three frequency bands of (1) 3,600 to 3,700 MHz, (2) 3,700 to 4,200 MHz, and (3) a frequency band exceeding 3,700 MHz are considered.

Accordingly, when the number of CBSDs with the band overlapping the band used by the FSS is simply counted, there is a possibility of the transmission power of the CBSD being excessively limited. Thus, it is important to consider a difference in the parameter such as the bandwidth of the CBSD or the operation frequency of the FSS, and then count the number (actual number) of CBSDs.

In the embodiment, in a case in which $FSS_n$ is assumed to be a protection target FSS, the number (actual number) of CBSDs is counted with the number of CBSDs operating on the completely same channel (the bandwidth and the central frequency are the same) as $FSS_n$ set as 1. In the following description, the operation frequency band of the FSS is divided into the above-described three cases of the frequency bands, (1) 3,600 to 3,700 MHz, (2) 3,700 to 4,200 MHz, and (3) a frequency band exceeding 3,700 MHz. This is because a protection reference of the FSS changes at the boundary of 3,700 MHz.

(1) 3,600 to 3,700 MHz $BW_{FSSn}$ (MHz) is a bandwidth of FSS and $BW_{CBSDm}$ (MHz) is a bandwidth of $CBSD_m$. In this case, when it is assumed that the bandwidths of $FSS_n$ and $CBSD_m$ are the same, interference near 1 MHz given to $FSS_n$ by $CBSD_m$ is calculated as follows.

$$I_{FSS_{m-n},IBE,SameFreq(mW/MHz)} = \frac{P'_{tx,CBSD_{m-n}(mW)} \cdot m_{G,m-n} \cdot m_F}{BW_{CBSD_n(MHz)}} \quad \text{[Math. 6]}$$

$P'_{tx,CBSD_{m-n}(mW)}$: Maximum allowable transmission power $m_{G,m-n}$: Path gain $m_F$: Gain by phasing Next, a case in which the bands of $FSS_n$ and $CBSD_m$ are different will be considered. In a case in which the bands of $FSS_n$ and $CBSD_m$ are different, interference per 1 MHz given to $FSS_n$ by $CBSD_m$ is calculated as follows.

$$I_{FSS_{m-n},IBE,DifferentFreq(mW/MHz)} = \quad \text{[Math. 7]}$$
$$\frac{P'_{tx,CBSD_{m-n}(mW)} \cdot ACIR_m \cdot m_{G,m-n} \cdot m_F}{BW_{CBSD_m(MHz)}}$$

-continued $ACIR_m$: Adjacent channel interference power ratio by application to $CBSD_m$ Accordingly, a power ratio, that is, the actual number per CBSD, can be obtained as follows.

[Math. 8]
$$\frac{I_{FSS_{m-n},IBE,DifferentFreq(mW/MHz)}}{I_{FSS_{m-n},IBE,SameFreq(mW/MHz)}} = \frac{P'_{tx,CBSD_{m-n}(mW)} \cdot ACIR_m \cdot m_{G,m-n} \cdot m_F}{BW_{CBSD_m(MHz)}}$$

$$\frac{BW_{CBSD_m(MHz)}}{P'_{tx,CBSD_{m-n}(mW)} \cdot m_{G,m-n} \cdot m_F}$$

$$= ACIR_m$$

Accordingly, an actual total number of CBSDs $M_{total, equivalent}$ to be considered for protection of $FSS_n$ can be obtained as follows.

[Math. 9]
$$M_{total,equivalent} = \left\lceil \sum_{m=0}^{M-1} ACIR_m \right\rceil$$

$M$: Physical total number of
    CBSDs contributing to interference in $FSS_n$ $\lceil \cdot \rceil$: Ceiling function. Round up integer of
    nearest neighbor in positive indefinite direction (2) 3,700 to 4,200 MHz In a case in which the operation frequency band of the FSS is 3,700 to 4,200 MHz, the same result as the foregoing case of 3,600 to 3,700 MHz is obtained. Here, in the case in which operation frequency band of the FSS is 3,700 to 4,200 MHz, all the CBSDs are equivalent to the case in which the frequency bands used in the primary system and the secondary system do not completely overlap, as illustrated in FIG. 11. Therefore, the following modification can be made.

[Math. 10]
$$M_{total,equivalent} = \left\lceil \sum_{m=0}^{M-1} ACIR_m \right\rceil$$

$$= \left\lceil \sum_{m=0}^{M-1} \left( 10^{\frac{-ACLR(\Delta f_{m-n})(dB)}{10}} + 10^{\frac{-ACS_n(\Delta f_{m-n})(dB)}{10}} \right) \right\rceil$$

$$= \left\lceil \sum_{m=0}^{M-1} \left( 10^{\frac{-ACLR(\Delta f_{m-n})(dB)}{10}} \right) + \sum_{m=0}^{M-1} \left( 10^{\frac{-ACS_n(\Delta f_{m-n})(dB)}{10}} \right) \right\rceil$$

$\Delta f$: Separation frequency

This expression indicates that the actual total number of CBSDs to be considered for protection of $FSS_n$ can be described as a total number of ACLR (antilogarithms) of CBSDs and ACSs of the FSSs.

(3) Case of Frequency Band Exceeding 3,700 MHz

In a case in which the operation frequency band of the FSS exceeds 3,700 MHz, the protection reference changes to the boundary of 3,700 MHz. Accordingly, it is preferable to satisfy the protection reference of the FSS at each of a band up to 3,700 MHz and a band equal to or greater than 3,700 MHz. Accordingly, at the band up to 3,700 MHz, the number described in "(1) 3,600 to 3,700 MHz" is the actual number of CBSDs. At the band equal to or greater than 3,700 MHz, the number described in "(2) 3.700 to 4,200 MHz" is the actual number of CBSDs.

In this way, the communication control device 100) according to the embodiment of the present disclosure can count the actual number of CBSDs. In addition, on the basis of the actual number of counted CBSDs, the communication control device 100 according to the embodiment of the present disclosure can calculate the maximum allowable transmission power of the secondary system so that the allowable interference level of the primary system is satisfied.

1.5. Advantageous Effect Examples

Figure 14:
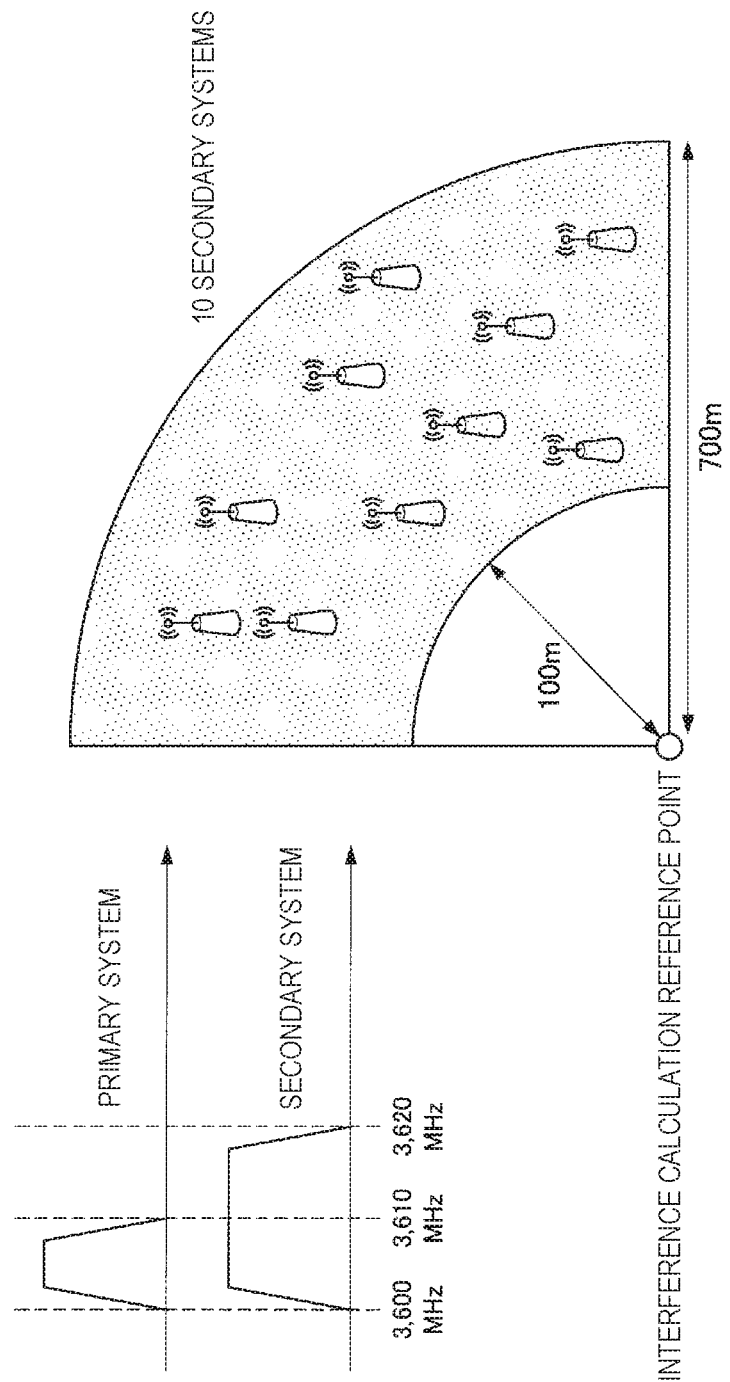
FIG. 14 is an explanatory diagram illustrating an example of a simulation scenario for describing an example of an advantageous effect of the embodiment of the present disclosure.

Next, advantageous effect examples of the embodiment of the present disclosure will be described. FIG. 14 is an explanatory diagram illustrating an example of a simulation scenario for describing an example of an advantageous effect of the embodiment of the present disclosure. In the example illustrated in FIG. 14, the bandwidth of the primary system is in the range of 3,600 to 3.610 MHz, the bandwidth of the secondary system is in the range of 3,600 to 3,620 MHz, and there are ten communication devices of the secondary system in a range of a radius of 100 meters to 700 meters from an interference calculation reference point.

A primary system protection reference (interference power) at the interference calculation reference point was set to −80 dBm/MHz, a path loss model was set to a free space model, the ACLR is was set to 36 dB, the ACS is was set to 32 dBm, and a standard deviation of lognormality shadowing was set to 0.5 dB.

When the same counting method as ECC Report 186 is applied, the number of devices operating as the secondary systems is 10. However, when the method of calculating the actual number of interference sources according to the embodiment of the present disclosure is used, the actual number of devices operating as the secondary system is obtained as follows.

[Math. 11]
$$M_{total,equivalent} = \left\lceil \sum_{m=0}^{9} ACIR_m \right\rceil$$

$$= \left\lceil \sum_{m=0}^{9} 10 \log_{10}\left(\frac{10}{20} + \frac{10}{20} \cdot 10^{\frac{-32(dB)}{10}}\right) \right\rceil$$

$$= \left\lceil 10 \cdot 10 \log_{10}\left(\frac{10}{20} + \frac{10}{20} \cdot 10^{\frac{-32(dB)}{10}}\right) \right\rceil$$

$$= 20$$

That is, when the method of calculating the actual number of interference sources according to the embodiment of the present disclosure is used, the actual number of devices operating as the secondary systems is 20.

Figure 15:
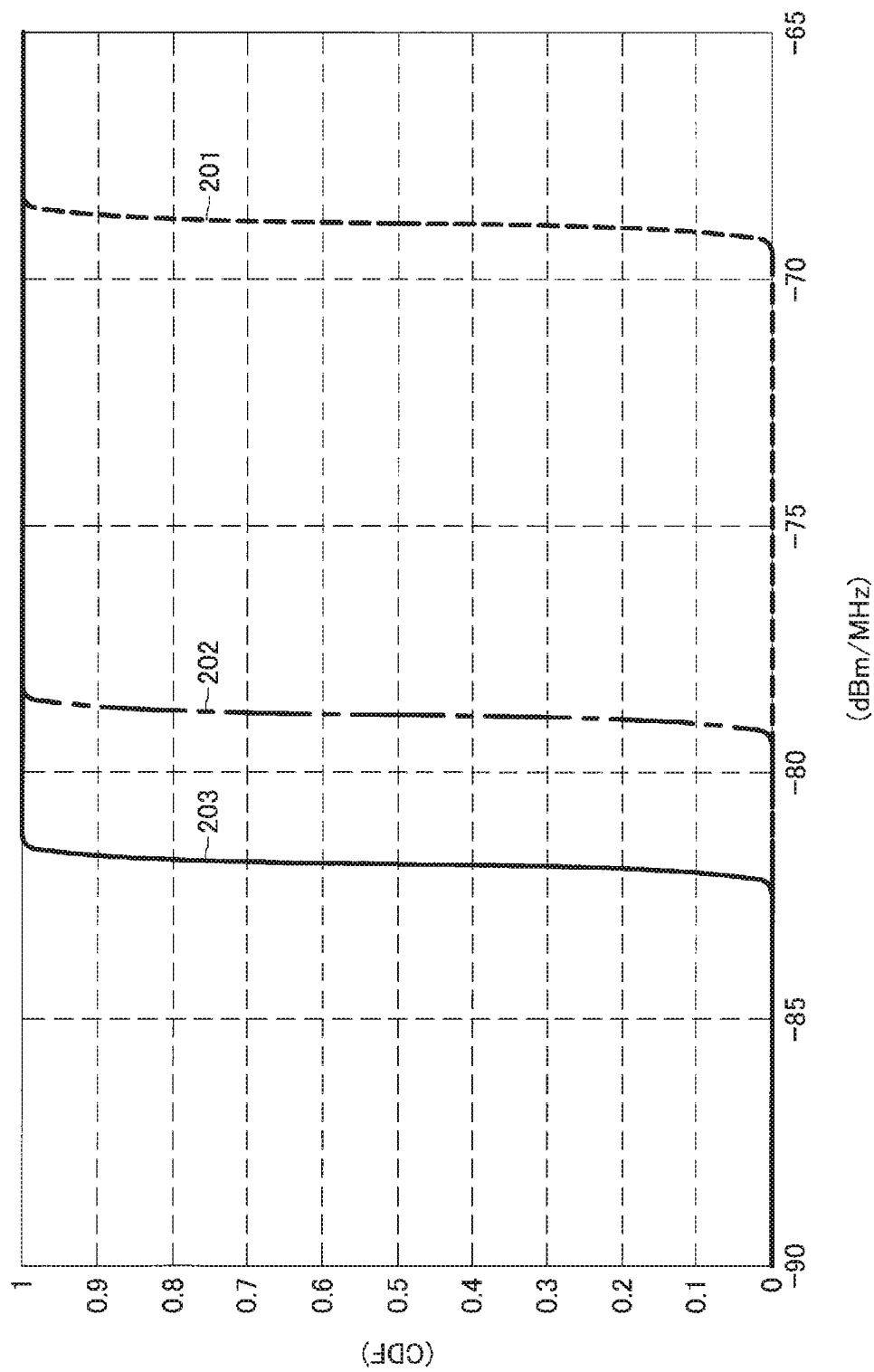
FIG. 15 is an explanatory diagram illustrating an example of an advantageous effect of the embodiment of the present disclosure in the simulation scenario illustrated in FIG. 14.

FIG. 15 is an explanatory diagram illustrating an example of an advantageous effect of the embodiment of the present disclosure in the simulation scenario illustrated in FIG. 14. In a graph illustrated in FIG. 15, the horizontal axis represents reception interference power [dBm/MHz] and the vertical axis represents CDF.

Reference numeral 201 denotes a case in which there is no interference margin, reference numeral 202 denotes a case in which flexible margin based on a method of counting interference sources in the related art is applied, and reference numeral 203 denotes a case in which flexible margin based on the method of counting interference sources according to the embodiment of the present disclosure is applied.

As illustrated in FIG. 15, in the case in which there is no interference margin, it can be understood that a primary system receives interference normally exceeding an interference threshold of −80 dBm/MHz. Even in the case in which the flexible margin based on the method of counting interference sources in the related art is applied, it can be understood that the primary system receives interference normally exceeding an interference threshold of −80 dBm/MHz.

In contrast, in the case in which the flexible margin based on the method of counting interference sources according to the embodiment of the present disclosure is applied, it can be understood that the protection reference of the primary system is satisfied since the interference does not exceed the interference threshold of −80 dBm/MHz. In this simulation, the flexible margin is applied setting 10 devices on the basis of the counting method of the related art and setting 20 devices on the basis of the method of counting the interference sources according to the embodiment of the present disclosure, and thus it can be understood that this difference is viewed as an advantageous effect of the embodiment of the present disclosure.

Note that the scenario used in this evaluation is planned for evaluation indicating the advantageous effect of the expression itself for counting the actual number. Regardless of the difference in the parameter, it is needless to say that the method of counting the interference sources according to the embodiment of the present disclosure can be applied to any case when a scenario is similar.

In the embodiment of the present disclosure, information regarding the ACIR (or the ACLR and the ACS) is necessary when the interference sources are counted. As the ACLR and the ACS, values regulated as follows in 3GPP TS 36.101, 36.104, or the like may be utilized.

TABLE 2

| Channel bandwidth of E-UTRA lowest/highest carrier transmitted $BW_{Channel}$ [MHz] | BS adjacent channel centre frequency offset below the lowest or above the highest carrier centre frequency transmitted | Assumed adjacent channel carrier (informative) | Filter on the adjacent channel frequency and corresponding filter bandwidth | ACLR limit |
|---|---|---|---|---|
| 1.4, 3.0, 5, 10, 15, 20 | $BW_{Channel}$ | E-UTRA of same BW | Square ($BW_{Config}$) | 45 dB |
| | 2 × $BW_{Channel}$ | E-UTRA of same BW | Square ($BW_{Config}$) | 45 dB |
| | $BW_{Channel}/2$ + 2.5 MHz | 3.84 Mcps UTRA | RRC (3.84 Mcps) | 45 dB |
| | $BW_{Channel}/2$ + 7.5 MHz | 3.84 Mcps UTRA | RRC (3.84 Mcps) | 45 dB |

TABLE 3

| Channel bandwidth of E-UTRA lowest/highest carrier transmitted $BW_{Channel}$ [MHz] | BS adjacent channel centre frequency offset below the lowest or above the highest carrier centre frequency transmitted | Assumed adjacent channel carrier (informative) | Filter on the adjacent channel frequency and corresponding filter bandwidth | ACLR limit |
|---|---|---|---|---|
| 1.4, 3 | $BW_{Channel}$ | E-UTRA of same BW | Square ($BW_{Config}$) | 45 dB |
| | 2 × $BW_{Channel}$ | B-UTRA of same BW | Square ($BW_{Config}$) | 45 dB |
| | $BW_{Channel}/2$ + 0.8 MHz | 1.28 Mcps UTRA | RRC (1.28 Mcps) | 45 dB |
| | $BW_{Channel}/2$ + 2.4 MHz | 1.28 Mcps UTRA | RRC (1.28 Mcps) | 45 dB |
| 5, 10, 15, 20 | $BW_{Channel}$ | E-UTRA of same BW | Square ($BW_{Config}$) | 45 dB |
| | 2 × $BW_{Channel}$ | E-UTRA of same BW | Square ($BW_{Config}$) | 45 dB |
| | $BW_{Channel}/2$ + 0.8 MHz | 1.28 Mcps UTRA | RRC (1.28 Mcps) | 45 dB |
| | $BW_{Channel}/2$ + 2.4 MHz | 1.28 Mcps UTRA | RRC (1.28 Mcps) | 45 dB |
| | $BW_{Channel}/2$ + 2.5 MHz | 3.84 Mcps UTRA | RRC (3.84 Mcps) | 45 dB |
| | $BW_{Channel}/2$ + 7.5 MHz | 3.84 Mcps UTRA | RRC (3.84 Mcps) | 45 dB |
| | $BW_{Channel}/2$ + 5 MHz | 7.68 Mcps UTRA | RRC (7.68 Mcps) | 45 dB |
| | $BW_{Channel}/2$ + 15 MHz | 7.68 Mcps UTRA | RRC (7.68 Mcps) | 45 dB |

TABLE 4

| Rx Parameter | Units | Channel bandwidth | | | | | |
|---|---|---|---|---|---|---|---|
| | | 1.4 MHz | 3 MHz | 5 MHz | 10 MHz | 15 MHz | 20 MHz |
| ACS | dB | 33.0 | 33.0 | 33.0 | 33.0 | 30 | 27 |

For the ACS, since there is a variation due to a wireless communication device using the secondary system, the geo-location function may be notified of a value specific to the wireless communication device. For the ACLR, the geo-location function may also be notified of the value specific to the wireless communication device. In addition, for the ACS, that is, characteristics of a receiver side, a sensitivity suppression effect (blocking) may be considered. Accordingly, the present disclosure is not limited to the ACS and all parameters contributing to reception characteristics of a receiver may be used.

2. Conclusion

As described above, according to the embodiment of the present disclosure, there is provided the communication control device 100 that appropriately counts the number of devices operating as the secondary systems regardless of a difference in the operation frequency band or bandwidth of the primary and secondary system. In addition, according to the embodiment of the present disclosure, there is provided the communication control device 100 that can appropriately count the number of devices operating as the secondary systems and appropriately set an interference margin on the basis of the counted number.

The communication control device 100 according to the embodiment of the present disclosure can safely perform frequency sharing without giving harmful interference (aggregate interference) to the primary system (for example, FSS) by appropriately counting the number of devices operating as the secondary systems regardless of a difference in the operation frequency band or bandwidth of the primary and secondary system and appropriately setting an interference margin.

A computer program for causing hardware such as a CPU, a ROM, and a RAM that is incorporated in each apparatus, to execute a function equivalent to the above-described configuration of each apparatus can also be created. In addition, a storage medium storing the computer program can also be provided. In addition, by forming each functional block illustrated in a functional block diagram, by hardware or a hardware circuit, a series of processes can also be implemented by hardware or a hardware circuit.

The preferred embodiment(s) of the present disclosure has/have been described above with reference to the accompanying drawings, whilst the present disclosure is not limited to the above examples. A person skilled in the art may find various alterations and modifications within the scope of the appended claims, and it should be understood that they will naturally come under the technical scope of the present disclosure.

Further, the effects described in this specification are merely illustrative or exemplified effects, and are not limitative. That is, with or in the place of the above effects, the technology according to the present disclosure may achieve other effects that are clear to those skilled in the art from the description of this specification.

Additionally, the present technology may also be configured as below.

(1)
A communication control device including
an interference source calculation unit configured to calculate an actual number of interference sources for a first wireless system, using information regarding interference imposed on the first wireless system from a second wireless system using a second frequency band at least partially overlapping a first frequency band used by the first wireless system.

(2)
The communication control device according to (1), in which the interference source calculation unit uses an adjacent channel interference power ratio related to the interference imposed on the first wireless system from the second wireless system as the information regarding the interference.

(3)
The communication control device according to (2), in which the interference source calculation unit uses a parameter related to the adjacent channel interference power ratio as the information regarding the interference.

(4)
The communication control device according to any one of (1) to (3), in which the actual number is a number equivalent to a total number of devices operated at a same channel and a same bandwidth.

(5)
The communication control device according to any one of (1) to (4), further including
a power calculation unit configured to calculate maximum allowable transmission power of the second wireless system so that an allowable interference level of the first wireless system is satisfied, using the number calculated by the interference source calculation unit.

(6)
The communication control device according to any one of (1) to (5), in which the second frequency band overlaps the entire first frequency band.

(7)
The communication control device according to any one of (1) to (5), in which the first frequency band overlaps the entire second frequency band.

(8)
A communication control method including
calculating an actual number of interference sources for a first wireless system, using information regarding interference imposed on the first wireless system from a second wireless system using a second frequency band at least partially overlapping a first frequency band used by the first wireless system.

(9)
A computer program causing a computer to perform
calculating an actual number of interference sources for a first wireless system, using information regarding interference imposed on the first wireless system from a second wireless system using a second frequency band at least partially overlapping a first frequency band used by the first wireless system.

REFERENCE SIGNS LIST 100 communication control device

The invention claimed is:
1. A communication control device comprising:
interference source calculation circuitry configured to calculate a number of interference sources for a first wireless system, using information regarding interfer- ence imposed on the first wireless system from a second wireless system using a second frequency band at least partially overlapping a first frequency band used by the first wireless system, wherein the information regarding the interference comprises information about:
- a first channel width of the second frequency band corresponding to same channel interference between the first wireless system and the second wireless system;
- a second channel width of the second frequency band corresponding to interference related to different channel leakage from the second wireless system to the first wireless system; and
- a third channel width of the second frequency band corresponding to interference related to an adjacent channel selectivity of the first wireless system.

2. The communication control device according to claim 1, wherein the information about the second and third channel widths are used to determine an adjacent channel interference power ratio related to the interference imposed on the first wireless system from the second wireless system.

3. The communication control device according to claim 1, further comprising;
  power calculation circuitry configured to set a maximum allowable transmission power of the second wireless system so that an allowable interference level of the first wireless system is satisfied, using the number determined by the interference source calculation circuitry.

4. The communication control device according to claim 1, wherein values corresponding to the first, second and third channel widths correspond to whether:
  the first frequency band is identical to the second frequency band;
  the first frequency band is larger than and encompasses an entirety of the second frequency band;
  the second frequency band is larger than and encompasses an entirety of the first frequency band; or
  only a subset of the first frequency band overlaps with the second frequency band.

5. A communication control method performed by a communication control device including a processor, the method comprising:

determining a number of interference sources for a first wireless system, using information regarding interference imposed on the first wireless system from a second wireless system using a second frequency band at least partially overlapping a first frequency band used by the first wireless system; and operating the second wireless system in accordance with the determined number, wherein the information regarding the interference comprises information about:
- a first channel width of the second frequency band corresponding to same channel interference between the first wireless system and the second wireless system;
- a second channel width of the second frequency band corresponding to interference related to different channel leakage from the second wireless system to the first wireless system; and
- a third channel width of the second frequency band corresponding to interference related to an adjacent channel selectivity of the first wireless system.

6. The method according to claim 5, wherein values corresponding to the first, second and third channel widths correspond to whether:
  the first frequency band is identical to the second frequency band;
  the first frequency band is larger than and encompasses an entirety of the second frequency band;
  the second frequency band is larger than and encompasses an entirety of the first frequency band; or
  only a subset of the first frequency band overlaps with the second frequency band.

7. The method according to claim 5, wherein the operating the second wireless system comprises:
  setting a maximum allowable transmission power of the second wireless system so that an allowable interference level of the first wireless system is satisfied, using the determined number.

8. A non-transitory computer readable product containing instructions causing a computer to perform the method of claim 5.

* * * * *